United States Patent
Bauerschmidt et al.

(10) Patent No.: US 6,239,723 B1
(45) Date of Patent: May 29, 2001

(54) ENCAPSULATED INSTALLATION

(75) Inventors: Peter Bauerschmidt, Schwabach; Ottmar Beierl, Aurachtal; Gerd Scholl, München; Oliver Sczesny, Aschheim; Wolf-Eckhart Bulst; Valentin Magori, both of München; Thomas Ostertag, Finsing; Leonhard Reindl, Stephanskirchen; Dieter Lorenz, Berlin, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/127,517

(22) Filed: Jul. 31, 1998

Related U.S. Application Data

(63) Continuation of application No. PCT/DE97/00092, filed on Jan. 20, 1997.

(30) Foreign Application Priority Data

Jan. 31, 1996 (DE) .............................. 196 03 459

(51) Int. Cl.[7] .................................................. G08C 19/04
(52) U.S. Cl. .................................. 340/870.11; 340/693.5; 324/126; 324/536
(58) Field of Search ........................... 340/870.11, 693.5, 340/693.6, 647; 324/126, 536, 514

(56) References Cited

U.S. PATENT DOCUMENTS

| | | |
|---|---|---|
| 4,158,810 | 6/1979 | Leskovar . |
| 5,214,595 * | 5/1993 | Ozawa et al. .................. 340/647 |
| 5,396,180 * | 3/1995 | Hampton et al. ................. 340/647 |

FOREIGN PATENT DOCUMENTS

| | | |
|---|---|---|
| 24 27 830 | 1/1975 | (DE) . |
| 25 46 694 | 4/1976 | (DE) . |
| 41 16 281 A1 | 12/1991 | (DE) . |
| 41 01 858 C1 | 5/1992 | (DE) . |
| 42 00 076 A1 | 8/1993 | (DE) . |
| 94 20 199 | 3/1995 | (DE) . |
| 195 14 342 C1 | 2/1996 | (DE) . |
| 0 314 849 A1 | 5/1989 | (EP) . |
| 0 673 098 A1 | 9/1995 | (EP) . |

OTHER PUBLICATIONS

"Acoustic Surface Wave Technology for Innovations" (Bulst), Siemens Magazine Special, 1994, pp. 2–6.

"Probabilistic investigations on BIT ratio requirement for digital teleprotection employing digital microwave links" (Serizawa et al.), Transactions on Power Delivery, vol. 7, No. 1, Jan. 1992, pp. 202–206.

* cited by examiner

*Primary Examiner*—Michael Horabik
*Assistant Examiner*—Timothy Edwards, Jr.
(74) *Attorney, Agent, or Firm*—Herbert l. Lerner; Laurence A. Greenberg; Werner H. Stemer

(57) ABSTRACT

An encapsulated installation, in particular a switching installation for high or medium voltage, includes a plurality of sensors located in an interior of an encapsulation. A central monitoring device is provided for information interchange with the surface acoustic wave sensors. An antenna element of the monitoring device is disposed at the encapsulation and is directed towards the interior. The sensors can be interrogated selectively.

25 Claims, 3 Drawing Sheets

ENCAPSULATED INSTALLATION

CROSS-REFERENCE TO RELATED APPLICATION

This application is a continuation of International Application No. PCT/DE97/00092, filed on Jan. 20, 1997, which designated the United States.

BACKGROUND OF THE INVENTION

1. Field of the Invention

The invention relates to an encapsulated installation for electrical power having a plurality of sensors disposed in the interior.

German Utility Model 94 20 199 discloses a metal-encapsulated high-voltage switching installation in which a surface acoustic wave element (SAW) is disposed in one of its gas areas. The SAW is used to verify gas constituents, which are produced by the effect of arcing on extinguishing gas that is contained in the encapsulation, or to detect pressure waves. In that case, an antenna, which is used for wireless information transmission to an evaluation device, is disposed on the outside of the encapsulation. German Patent DE 195 14 342 C1, which was issued subsequent to the priority date of the instant application and corresponds to U.S. Pat. Application Ser. No. 08/953,965 filed Oct. 20, 1997, discloses the use of SAW sensors in a high-voltage cable.

The use of SAW sensors in high-voltage technology is known, in principle, from an article entitled "Akustische Oberflächenwellen-Technologie für Innovationen" [Surface Acoustic Wave Technology For Innovations] in Siemens-Zeitschrift Spezial [Siemens Journal, Special] FuE, Spring 1994. That article also provides for the SAW sensor to be mounted in a container, and for its antenna to be mounted externally.

2. Summary of the Invention

It is accordingly an object of the invention to provide an encapsulated installation, which overcomes the hereinafore-mentioned disadvantages of the heretofore-known devices of this general type and which provides a simple solution for the configuration of transmitting and receiving elements for information transmission on an encapsulated installation for electrical power, in which the intention is to permit reliable monitoring.

With the foregoing and other objects in view there is provided, in accordance with the invention, an encapsulated installation for electrical power, comprising an encapsulation having an interior and defining different gas areas; a plurality of sensors to be interrogated selectively, the sensors having respective transmitting/receiving elements, at least some of the sensors disposed in the interior, and at least some of the sensors disposed in the different gas areas; and a monitoring device having an antenna element for information interchange with the sensors, the antenna element disposed at the encapsulation and directed towards the interior.

This solution makes it possible to monitor a large number of functions through the use of remote interrogation using simple measures, without any wiring or mechanical outlay being incurred inside the encapsulation. Only the desired sensors need be fitted. This solution is also suitable for existing installations and can easily be extended. It is possible to accommodate the sensors in the encapsulation of the installation, even in unfavorable space conditions.

In accordance with again another feature of the invention, the sensors are preferably constructed as surface acoustic wave sensors (SAW). These sensors have a small physical size and high reliability. This permits accommodation in the interior of the encapsulation in a manner which is favorable during service, and a high level of safety during operation is provided. In one specific embodiment, the size of the sensor may be roughly that of a check card, with the majority of its form advantageously being used as an antenna element.

In accordance with another feature of the invention, at least some of the sensors are constructed to detect different measurement variables, as a result of which it is possible to detect a multiplicity of different information items and/or measurements. In this case, the sensors can be disposed in different subareas, in particular gas areas, in the installation. This applies, of course, only to the extent that information transmission is possible between two subareas through their compartmentalization.

In accordance with a further feature of the invention, the sensors may be constructed as active or preferably as passive components. In this way, account can be taken of the respective conditions at the respective installation location. A passive structure has the advantage that no electronics at all need be used. This is favorable for use at high voltages.

In accordance with an added feature of the invention, the sensors are disposed in the encapsulation at the potential of the encapsulation or at the potential of a conductor. This does not result in any limitation to specific detection values, potential conditions or installation locations. The installation location may even be movable (for example on a switching rod). No additional potential isolation devices are necessary.

In accordance with an additional feature of the invention, the monitoring device has at least one additional interface for information interchange with other sensors, SAWs, measurement sensors or detection devices. Overall incorporation of other information sources, even outside the encapsulation, is thus possible, which results in a multisensor concept.

In accordance with yet another feature of the invention, the other interface or interfaces can be constructed as a cable-based interface or interfaces, in particular an electrical, acoustic or optical interface or interfaces, or as a wireless interface, as a result of which it is possible to couple a wide range of information sources thereto.

In accordance with yet a further feature of the invention, there is provided an interface for coupling a monitoring device, which is at an equivalent or higher level, thereto. The interface can then preferably be constructed as a bus interface, as a result of which a high data transmission rate is possible.

In accordance with yet an added feature of the invention, coding is provided for selective interrogation. In this way, it is possible to distinguish between the respective information items and the assignment of the respective sources or sensors. The coding can be implemented by hardware or by a procedural measure, for example software.

In accordance with yet an additional feature of the invention, different frequencies may be assigned for information transmission to the respective sensors, for coding. Each sensor thus has its own information path or channel.

In accordance with again another feature of the invention, the coding can alternatively or additionally be carried out in conjunction with a frequency or time division multiplex method. This enables favorable, multiple use of existing frequency channels.

In accordance with again a further feature of the invention, the coding can be carried out by polarization, for example of the electromagnetic wave being used, possibly using a directional antenna, or correlation. This type of coding is favorable for use in metal encapsulation. Correlation methods are known in principle from radar technology, wherein a signal pattern is transmitted back with a response signal of the sensor and the signal pattern is identified by correlation.

In accordance with again an added feature of the invention, the coding can also be carried out through the use of an identification in the transmission or response signal during the information interchange. This results in a selective identification capability in the transmitting and receiving device in each case.

In accordance with again an additional feature of the invention, the encapsulation is metallic. This results in a preferred use of the installation for high or medium voltage. The information items which occur in a wide ranging manner there can thus be processed safely and easily. This also provides internal and external screening.

In accordance with still another feature of the invention, there is provided at least one switching device or a conductor inside the encapsulation. The installation is thus then constructed as a switching installation or tubular conductor.

In accordance with a concomitant feature of the invention, the antenna elements can optionally be constructed for the transmission of optical, acoustic or electromagnetic waves. This solution is optimized for high transmission reliability and high interference immunity with the maximum possible transmission rate, depending on the application. The present solution is particularly simple and can be integrated into new and existing installations without any problems. The antenna elements are fitted without any complex measures.

Comprehensive monitoring of a switching installation, of a tubular conductor or of an encapsulated component is possible through the use of the invention. It is possible to interrogate a multiplicity of sensors, in particular SAWs, remotely and selectively through one antenna element. In this case, the monitoring can be carried out accurately with respect to the gas area, with a considerable cost and complexity saving being provided, particularly in the case of large gas-insulated switching installations, in comparison with cable-based monitoring.

The term "encapsulated installation" predominantly and in general means installation parts for electrical power distribution, in particular for high or medium voltage, which have an encapsulation, a housing or a tank in which at least one electrical component is accommodated. Examples of this are: an encapsulated switch disconnector or circuit breaker, an encapsulated switching mechanism, an $SF_6$-insulated transformer or an $SF_6$ tubular conductor.

Other features which are considered as characteristic for the invention are set forth in the appended claims.

Although the invention is illustrated and described herein as embodied in an encapsulated installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
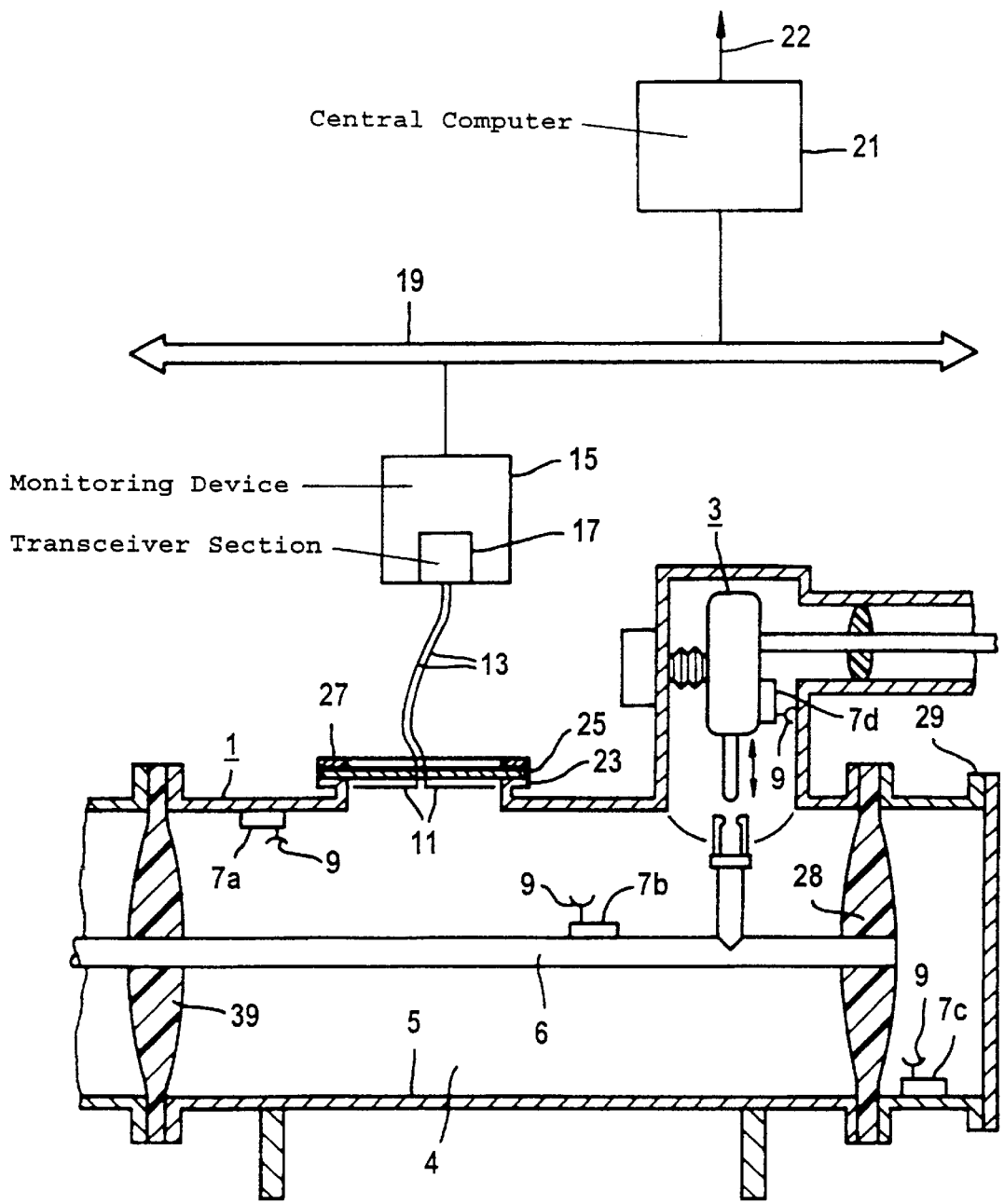
FIG. 1 is a fragmentary, diagrammatic, longitudinal-sectional view of a first switching installation having SAWs.

A general explanation will be given initially with reference to the figures of the drawing as a whole regarding a switching installation having a monitoring device, in which information transmission at radio frequency is used. It is self-evident that the monitoring device described can also be used for other functions within the switching installation, for example for detection of a switch position without sensors by using a radar principle, for additional control tasks, or purely for information transmission.

Referring now to FIG. 1 in detail, there is seen an encapsulated, gas-insulated switching installation 1, as is disclosed, for example, in the prior art according to the above-mentioned German Utility Model 94 20 199. The switching installation 1 is suitable for very high, high or medium voltage. The term "switching installation" in this context also refers to an encapsulated tubular conductor without a switching element.

A branch having a switching device 3, in particular a switch disconnector or an interrupter unit, is shown through a part of the switching installation 1 in the longitudinal section of FIG. 1. A busbar 6 runs centrally in an encapsulation 5 as an electrical conductor. Reference is made to the above-mentioned utility model for further details of the switching device 3 and its function.

Surface acoustic wave sensors (SAW) for a wide range of tasks, for example a SAW 7a for temperature detection, a SAW 7b for current detection, a SAW 7c for gas identification and a SAW 7d for position identification, are disposed as sensors in an interior 4 of the encapsulation 5 of the switching installation 1. Other SAWs are also conceivable in this case for other functions or tasks, for example for light identification or pressure measurement, etc.

Each SAW has at least one antenna 9, which is used as a transmitting/receiving element, for information transmission, in particular for interrogation, as a receiving and transmitting device. The information transmission in this case is carried out from the SAWs 7a to 7d to a central transmitting and receiving antenna, which acts for all of the SAWs 7a to 7d and is referred to as an antenna element 11 in the following text.

The terms "antenna", "transmitting and receiving antenna", "antenna element" or "receiving and transmitting device" in this case mean those radiating and receiving elements which make it possible to transmit and/or receive electromagnetic or optical waves. Examples thereof are, for example, radio antennas and ultrasound or optical transmitting and receiving elements (for example infrared elements), although it is also possible for this to cover a split in the transmitting and receiving directions. In principle, acoustic information transmission is also conceivable using appropriately constructed transmitting and receiving devices. As an example, the structure according to FIG. 1 relates to radio information transmission.

The antenna element 11 is connected through suitable cables 13, for example a coaxial cable, possibly with the interposition of a matching element, to a control and monitoring device (referred to as a monitoring device 15 in the following text). This monitoring device 15 includes a transmitting and receiving section 17 and a further device, which is not shown in more detail, for signal evaluation. It is also possible to cover a processor with a memory device, if required.

The transmitting and receiving section 17, or at least parts of it, can in principle also be disposed locally close to the antenna element 11, so that only low-power data traffic takes place between the monitoring device 15 and the antenna element 11. The transmitting power is then produced locally.

It is also conceivable for the antenna element 11 to be connected through the use of a local device by cables or without wires directly to a bus 19. The monitoring device 15, together with the transmitting and receiving section 17 and the connected antenna element 11, can also be referred to as a transmitting/receiving device or transceiver for the purposes of the present concept.

The monitoring device 15 may, for example, be a central unit in a switching installation or else a branch-related or equipment-related device, which is connected through a further data link, for example through the bus 19, to a higher level central computer 21, for data purposes. This central computer 21 may be a short-distance control central computer which, in turn, is connected through a suitable interface 22 to a higher-level network management center.

Of course the central computer 21 includes at least a suitable control and display device, for example a keyboard and a screen, for the operation of the switching installation 1. Portable equipment, for example a portable computer or a laptop, can also be connected through suitable interfaces, which are not shown in more detail, to various points in the system shown in FIG. 1, for example to the bus 19 or to the control device 15, for control or for other inputs and outputs.

The data links which are shown may be constructed as required, for example as a cable-based connection, in particular a wire cable or optical conductor, or a wireless connection, such as a radio, sound or optical link.

In the present example, the antenna element 11 is disposed inside the encapsulation 5, at an opening. In this case the opening is formed by a flange 23, which is closed by a closure element 25, for example a cover and a compression ring 27. Of course lead-throughs for the flange connection, which are not shown in more detail, can be provided in this case according to the prior art.

The antenna element 11 is thus located inside the encapsulation 5 so that this results in the best conditions for problem-free information transmission to the SAWs 7a to 7d. Since the antenna element 11 is virtually located inside a connecting stub and does not project into the interior 4, electrical or in-service problems are avoided in this case. In addition, the antenna element 11 forms a unit together with a component, which can be detached from the encapsulation 5 anyway, so that it is easily accessible or else can be retrofitted.

In this case, the SAWs 7a to 7d are disposed in such a way that some of them are on the encapsulation 5, some on the busbar 6, on a moving part of the switching device 3 or else on or behind a first insulated support 28, possibly in a separate gas area. A plurality of sensors for different functions may possibly be disposed together at one location and have a common antenna. It is also possible for one sensor to cover a plurality of measurement functions. The sensors can advantageously be constructed in the manner and size of a check card, with a majority of the card forming the antenna.

The essential feature for the operation of the entire monitoring system is that a reliable radio or data link exists inside the encapsulation 5. To this end, the insulated support 28 is manufactured from a dielectric material, so that radio-frequency transmission is also not adversely affected between the antenna element 11 and the SAW 7c, which is located behind the insulated support 28. In the case of other transmission methods, the material of the insulated support can be provided as appropriate (for example glass in the case of optical transmission).

The flange 23 or the opening which is required for the input coupling may, for example, be part of an existing maintenance opening, of a gas filling connecting stub, of a cast-resin filling opening, of a sight glass or else of an end flange. The structures which are described in this case by way of example can thus be used in principle for any possible openings on switching installations, for example for an illustrated end flange 29, as well. A specially introduced opening can also be used.

It is also conceivable for the antenna element 11 to be disposed outside the encapsulation 5 and to radiate into the interior 4 through a dielectric window. In this case, a filling connecting stub in the region of a connecting flange of two encapsulation sections may be used as the opening, for example, with the antenna element possibly being constructed as a rod antenna and being potted in the opening.

A configuration of a further antenna, which is not shown in more detail, has an associated control device in a gas area behind a further insulated support 39. In this case it is also possible to use the interior 4 of the encapsulation 5 as a transmission area, so that protected data transmission is possible over long distances. This option can be used in a preferred manner in the case of tubular conductors. A combination with a simultaneous sensor interrogation is conceivable.

The present concept relates essentially to the selective detection of measurements, variables or information detected by the respective sensors, in particular the SAWs 7a to 7d. In this configuration, it is possible to distinguish first of all between whether the SAWs are or are not called up selectively.

Selective call-up can take place, for example, through the use of different frequencies (or channels). In this case, a separate transmission channel would virtually be reserved for each SAW. The call-up signal at the central end and the response signal at the SAW end in each case would be located on the same transmission channel.

A further option includes a coding, identification or other selection signal being transmitted with a call-up signal which can be received by all of the SAWs. That signal is identified in the respective SAW to be activated and then emits a response signal containing the corresponding information. It is thus possible for only the respectively addressed SAW (or SAW group) to respond.

It is furthermore possible for all of the SAWs 7a to 7d to be activated by the antenna element 11 using a common call-up signal, with the selection being made subsequently, after reception by the antenna element 11. This can be done, for example, by the call-up signal being used to request the selected SAW to insert an identification, for example a pulse or a signal pattern, in its response signal. The signal mixture emitted jointly by all of the SAWs is then analyzed to find the identification, as a result of which the corresponding response signal can be filtered out and selected in the monitoring device 15. A correlation method can be used in this case, for example.

Particularly simple selection can be achieved if the SAWs 7a to 7d emit response signals at different frequencies. The response signals are received purely by different receiving antennas, which are formed by the common antenna element 11 of the monitoring device 15, and the response signals are passed on through different cables for respectively separate reception evaluation in the transmitting and receiving section 17. The important feature in this case is that only one common feed is required to the antenna element 11, or a common opening.

All of the SAWs 7a to 7d are thus called up by an antenna element 11. The respective response signals are selected by a receiving antenna which is matched or set appropriately to the signal frequency of the response signal of the respective SAW. In consequence, there is no need for any complex selection inside the monitoring device 15. The respective receiving antennas can then, possibly, also be connected to the common monitoring device 15, for example through the use of a multiplexing or changeover method.

A further option is to use a time division multiplex method. The SAWs 7a to 7d that are called up in this case emit their response signal at the same frequency, but staggered successively in time. The selection is then carried out in the monitoring device 15 just by selection of the response signal which is located in the time window and is emitted by the respective SAW 7a to 7d.

A further conceivable option is for the respective SAWs 7a to 7d to emit a differently polarized response signal, through the use of which it is possible to distinguish between the respective response signals. Distinguishing between the polarized electromagnetic waves could then be carried out by a plurality of antennas or by an adjustable antenna element 11. The use of this technique is particularly conceivable for the limited propagation area of the waves, namely the encapsulation, which can be described specifically in this case. It is also possible for a specific SAW to only or additionally include distinguishing or auxiliary functions, which assist or supplement one of the selection methods indicated herein.

If required, other selection or distinguishing methods according to the prior art are also possible. These are known, for example, by the following terms: space diversity, antenna diversity, angle diversity, field component diversity or protocol interchange (secondary radar principle).

Figure 2:
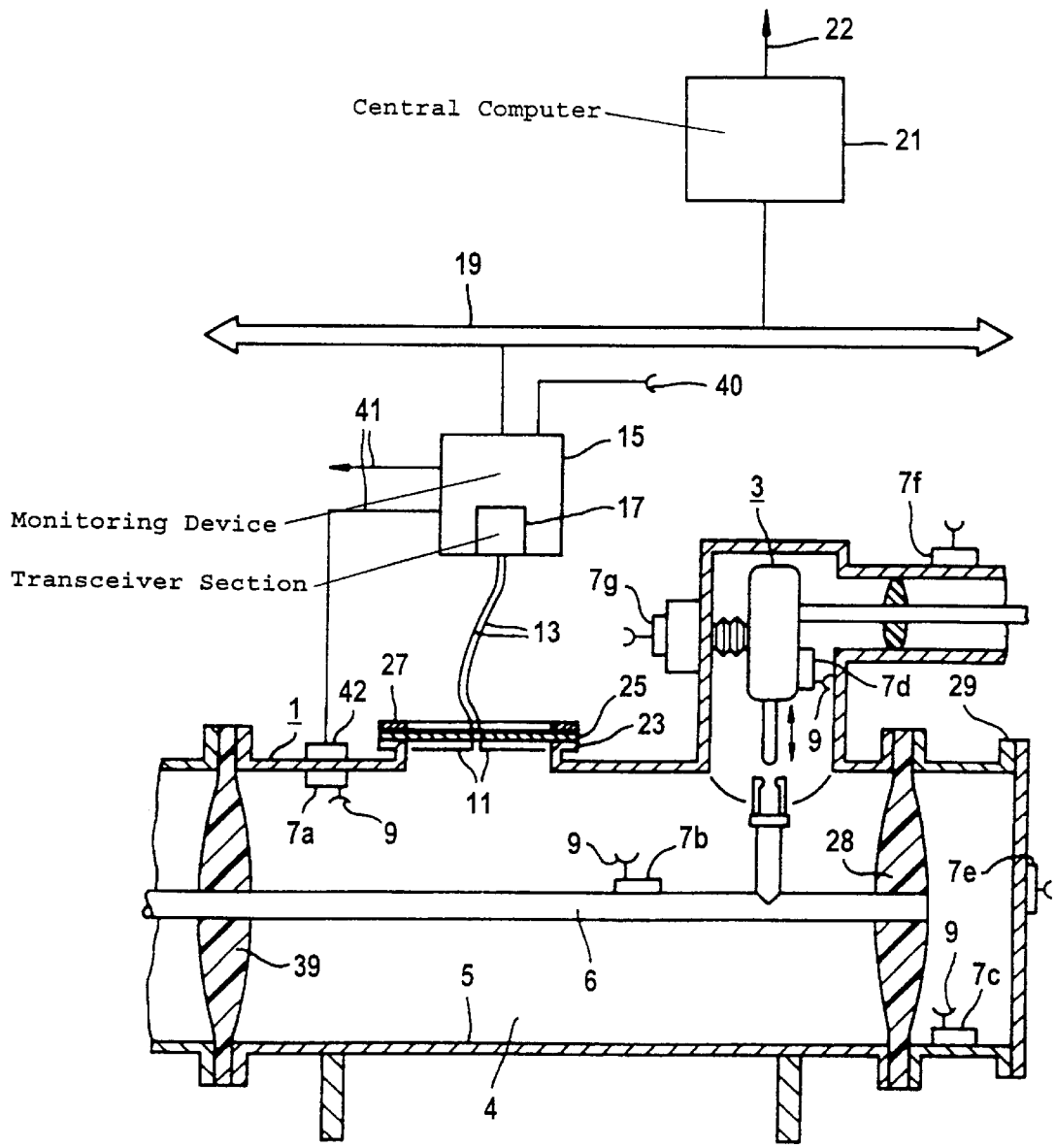
FIG. 2 is a view similar to FIG. 1 showing a second switching installation, having further SAWs outside its encapsulation.

FIG. 2 shows a switching installation 1 in which further SAWs 7e to 7g disposed outside the encapsulation 5 are provided, in addition to the previous SAWs 7a to 7d. These further SAWs are constructed, for example, for picking up an outside temperature (with the SAW 7e), a switching rod position (with the SAW 7f) or magnetic information (with the SAW 7g), for example from a position encoder.

Since the antenna elements 11 of the monitoring device 15 inside the encapsulation 5 are subject to a screening effect, the monitoring device 15 is assigned an antenna 40 which is disposed outside the encapsulation 5 as an additional interface. This antenna 40 is specifically responsible for the SAWs 7e to 7g located outside, which can possibly also be assigned to other installation parts or equipment, for example an open air switch or its switching linkage.

Of course, the interrogation of the SAWs located outside can also be carried out by a further control and monitoring device which is not shown in detail, but which is then connected in terms of data to a common higher-level device, for example the central computer 21. Other interfaces 41 may optionally also be provided through which other sensor units, for example protection devices, optical current and voltage converters or similar sensors configured as already mentioned above, can be connected but which are cable based, in contrast to those described above. Another sensor 42 is an example thereof. Wire cables or optical cables may possibly be used in this case as transmission lines.

Figure 3:
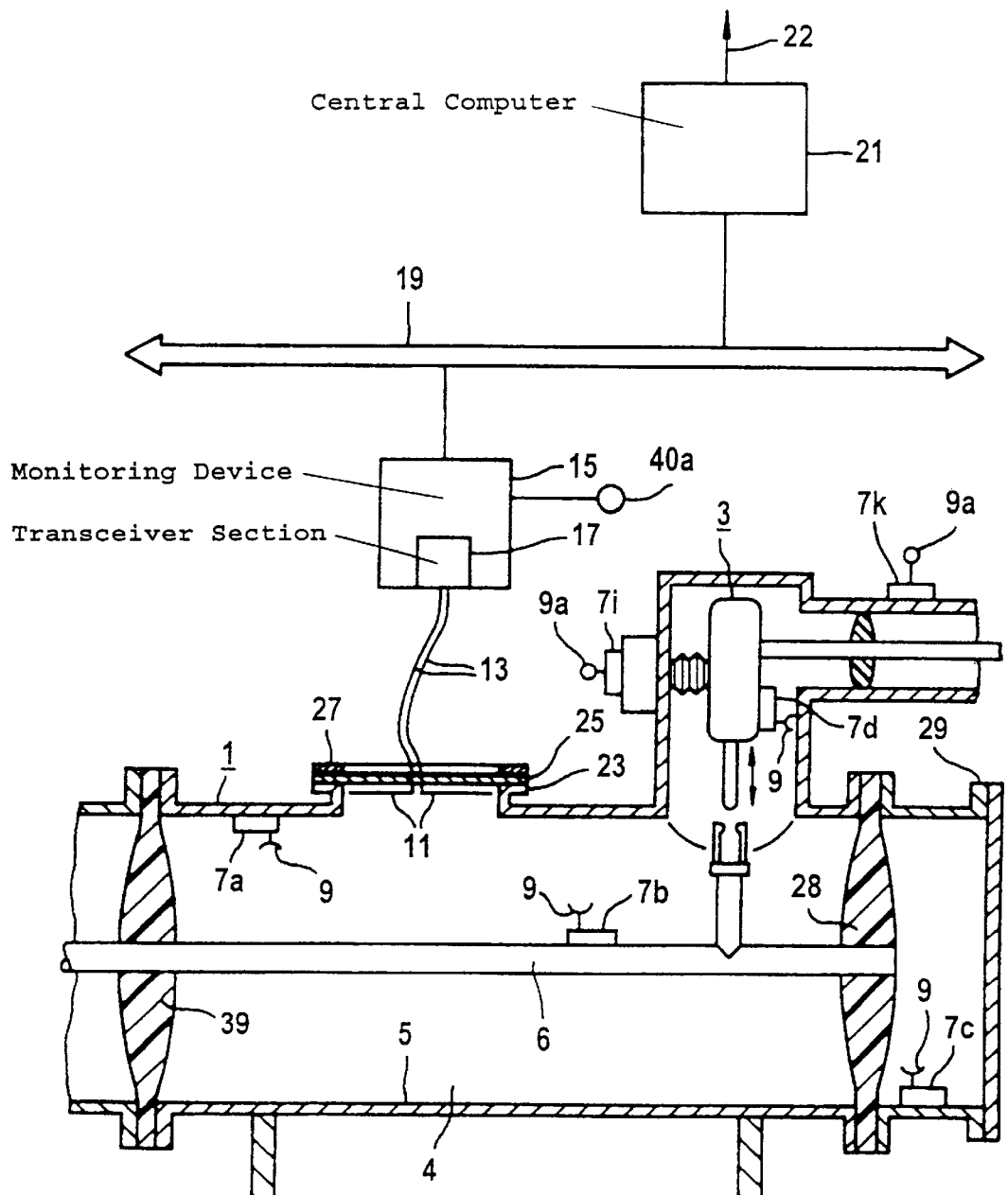
FIG. 3 is a view similar to FIGS. 1 and 2 showing a third switching installation, using optical information transmission.

FIG. 3 shows a further variant, in which information transmission between monitoring device SAWs 7i and 7k located outside takes place optically. The monitoring device 15 has an infrared transmitting and receiving element 40a as the antenna element provided for this purpose. Antenna elements 9a of the SAWs 7i and 7k are accordingly constructed as infrared devices.

This type of information transmission can, of course, also be applied to the information transmission inside the switching installation 1, within a closed gas area. The variant according to FIG. 3 can, of course, also be constructed in principle with acoustic information transmission, for example in the ultrasound band.

The SAWs 7a to 7k may be constructed as an active or as a passive component. If constructed as an active component, an additional power supply is required. This additional power supply may be provided, for example, by an energy storage device, in particular a battery, by a power source which is present on site, or by additional power transmission. This transmission is preferably produced by a call-up signal which is transmitted by the antenna element 11 and also transfers the corresponding power. However, it is also conceivable for the additional energy to be transferred on other paths, for example through optical conductors or on radio or opto-technical paths. If required, it is also possible to receive power at the installation location of the SAWs.

The sensors described herein can preferably be disposed in areas in the installation which are free of any fields or where the fields are reduced. Interference sensitivity is thus prevented. In this case, they are accommodated at a point which is suitable for the respective measurement variable and which may possibly be provided by the shaping of the encapsulation 5 or of its fittings.

The above-mentioned individual features and embodiments of the present new concept can, of course, be combined with one another or with features from the prior art within the scope of specialist trade, without departing from the basic essence of the invention.

We claim:

1. An encapsulated installation for electrical power, comprising:
   an encapsulation having an interior and defining different gas areas;
   a plurality of sensors to be interrogated selectively, said sensors having respective wireless transmitting/receiving elements, at least some of said sensors being disposed in said interior, and at least some of said sensors being disposed in said different gas areas; and
   a monitoring device having an antenna element for wireless information interchange with said sensors, said antenna element being disposed at said encapsulation and directed towards said interior.

2. The encapsulated installation according to claim 1, wherein at least some of said sensors detect different measurement variables.

3. The encapsulated installation according to claim 1, wherein said sensors are active components.

4. The encapsulated installation according to claim 1, wherein said sensors are passive components.

5. The encapsulated installation according to claim 1, wherein said sensors are each disposed in said encapsulation at a potential of said encapsulation.

6. The encapsulated installation according to claim 1, including a conductor associated with said encapsulation, said sensors each disposed in said encapsulation at a potential of said conductor.

7. The encapsulated installation according to claim 1, wherein said encapsulation is metallic.

8. The encapsulated installation according to claim 1, including at least one switching device disposed in said encapsulation for high or medium voltage.

9. The encapsulated installation according to claim 1, including a conductor disposed in said encapsulation for high or medium voltage.

10. The encapsulated installation according to claim 1, wherein said transmitting/receiving elements are constructed for the transmission of optical, acoustic or electromagnetic waves.

11. The encapsulated installation according to claim 1, wherein said sensors are surface acoustic wave sensors.

12. The encapsulated installation according to claim 1, wherein said monitoring device has at least one interface for information interchange with other sensors, measurement sensors or detection devices.

13. The encapsulated installation according to claim 12, wherein said interface is a cable-based interface.

14. The encapsulated installation according to claim 12, wherein said interface is an electrical interface.

15. The encapsulated installation according to claim 12, wherein said interface is an optical interface.

16. The encapsulated installation according to claim 12, wherein said interface is a wireless interface.

17. The encapsulated installation according to claim 12, wherein said interface is provided for coupling to a monitoring device at an equivalent or higher level.

18. The encapsulated installation according to claim 1, wherein said sensors are selectively interrogated using a selective interrogation device.

19. The encapsulated installation according to claim 18, wherein said sensors are selectively interrogated using different channels for information transmission to said respective sensors.

20. The encapsulated installation according to claim 18, wherein said sensors are selectively interrogated using different frequencies for information transmission to said respective sensors.

21. The encapsulated installation according to claim 18, wherein said sensors are selectively interrogated using a frequency multiplex method.

22. The encapsulated installation according to claim 18, wherein said sensors are selectively interrogated using a time division multiplex method.

23. The encapsulated installation according to claim 18, wherein said sensors are selectively interrogated using polarization.

24. The encapsulated installation according to claim 18, wherein said sensors are selectively interrogated using correlation.

25. The encapsulated installation according to claim 18, wherein said sensors are selectively interrogated using an identification in a transmitted or response signal.

* * * * *